No. 683,925.  
J. L. FRAZIER.  
THILL COUPLING.  
(Application filed Oct. 26, 1900.)
(No Model.)
Patented Oct. 8, 1901.
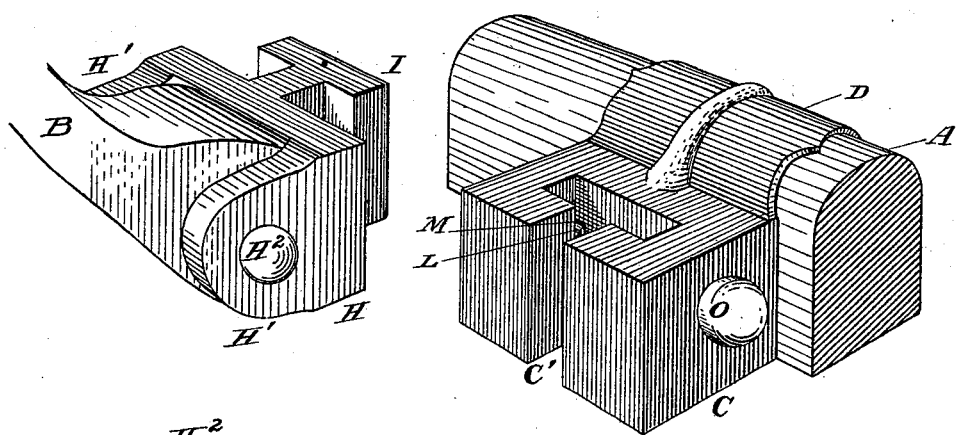
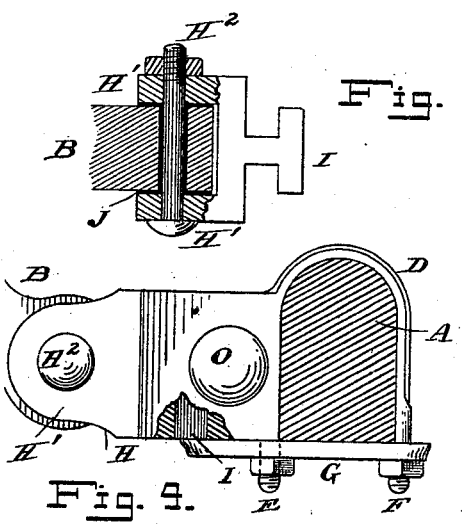
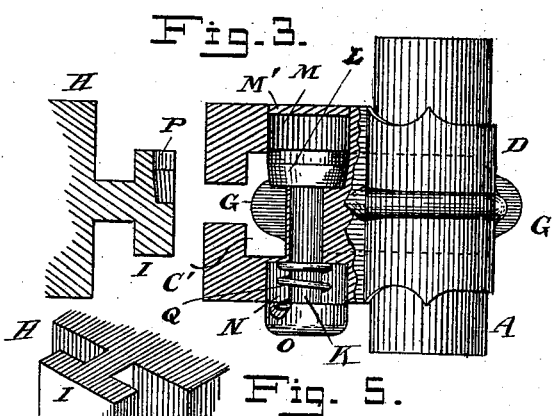
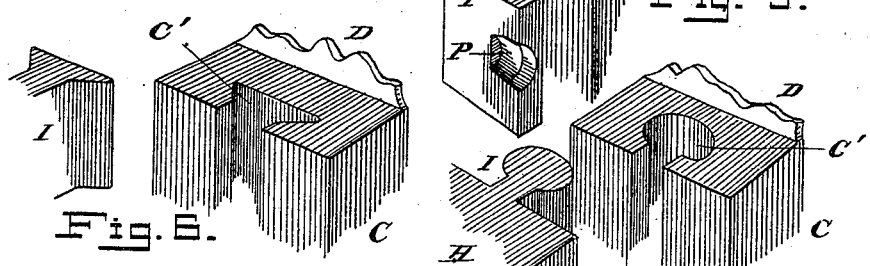
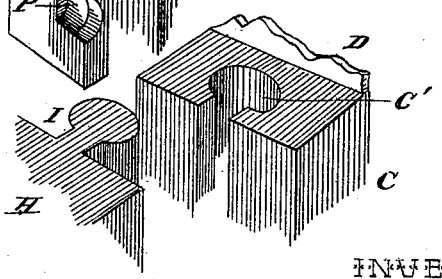
WITNESSES—
INVENTOR
James L. Frazier,
BY L. N. Thurlow,
ATTY.

UNITED STATES PATENT OFFICE.

JAMES L. FRAZIER, OF PEORIA, ILLINOIS.

THILL-COUPLING.

SPECIFICATION forming part of Letters Patent No. 683,925, dated October 8, 1901.

Application filed October 26, 1900. Serial No. 34,520. (No model.)

*To all whom it may concern:*

Be it known that I, JAMES L. FRAZIER, a citizen of the United States, residing at Peoria, in the county of Peoria and State of Illinois, have invented certain new and useful Improvements in Thill-Couplings; and I do hereby declare that the following is a full, clear, and exact description of the invention, which will enable others skilled in the art to which it appertains to make and use the same.

This invention relates to improvements in thill-couplings; and it has for its object to provide a simple, cheap, and efficient coupling and one that will be free from rattle or vibration.

In the appended drawings, Figure 1 is a perspective view of the coupling, showing its parts separated to more clearly show the construction. Fig. 2 is a part-sectional view of a thill having a portion of the coupler attached thereto and a filling, of rubber or other suitable material, to prevent rattle. Fig. 3 is a plan view of the coupler in part section, showing the portions separated. Fig. 4 is a side view of the coupler in part section. Fig. 5 is a perspective view of the thill portion of the coupler, showing a recess for receiving a catch in the other portion of the device. Fig. 6 is a perspective view of a coupling, showing the complementary parts of a modified form. Fig. 7 is also a modified form of these portions.

In the various figures, A is the axle and B the thill. The body of one portion of the coupling (indicated by C) is rigidly secured to the axle A by means of a clip D, which is secured to or made a part of the said body, the latter method being preferred. A threaded stud E, Fig. 4, on the under side of the said body C corresponds with the free extremity F of the said clip D, and a keeper G is slipped upon the two extremities, and this is followed by suitable nuts, as shown, which when tightened firmly secure the coupler to the axle. This, however, is common to all couplers of this kind, and I attach no claim thereto. The body C consists of a block having a T-shaped groove C' formed therein, extending from the top to the bottom. This is indicated as extending entirely through the block; but it may only be carried part way through, if so desired. The complementary portion of the coupler is constructed as shown in Figs. 1, 2, 3, and 5, in which the body thereof (indicated by H) carries a T-shaped projection or tongue designed to slip into the T-shaped slot C' in the said body C. The said portion H consists of a pair of ears H', between which is held the thill B by means of a bolt H², Fig. 2. In the latter figure a filling, of hard rubber or other suitable material, is placed between the eye of the thill and the bolt H² and between the said eye and the ears H'. This will prevent any rattle due to vibration. Behind slot C' in the body C is a horizontal bore which receives the stem K of a catch L. Said bore is enlarged at the ends to form recesses M and N, the former to receive the said catch L and the latter a finger-piece or button O on the said stem K. The bore carrying the said stem K, as well as the bore N, is entirely within the body, while the bore M opens into the slot C', as shown in Figs. 1 and 3. These enlarged bores are made by drilling into each side of the body, the bore M being afterward closed by means of a filler M'. The tongue I of the body H, as shown in Figs. 3 and 5, is provided with a groove P, which corresponds in form with that of the catch or disk L and into which the latter seats itself when the parts are interlocked by the pressure of the spring Q, which surrounds the stem K within the recess N and which presses against the head O and the bottom of the said recess. This is an "opening-spring" and acts to normally keep the catch in the position shown in Fig. 3. In order that the parts may be held as firmly as possible, I taper the catch and the recess for receiving it, so that the former when seating itself within the latter will make a snug fit. I have shown two modifications of the form of the tongue I and the slot C', as shown in Figs. 6 and 7, and of course others may be used as well. It will be seen by this that I do not confine myself to any particular outline thereof. In entering the tongue in the slot C' pressure is applied to the button O, thereby giving a clear passage for such tongue, which may then be lowered into position. By removing the pressure of the finger the catch will regain its position by entering the recess P and holds the parts against separation. It is evident that the catch may be merely pushed in to permit the tongue I to enter behind it and then released. Then by forcing the said tongue down the catch will slip into position as soon as the recess P is opposite it. As before indicated, I may not run the slot C' entirely through the body C, but leave a bottom for the tongue to rest upon. In the drawings I have extended the keeper G, as shown in Figs. 3 and 4, so that the tongue may rest upon it.

Evidently other forms of my improved coupler may be made both as to the shape of the parts and the kind of catch for locking such parts together without departing from the spirit of my invention. The position of the parts C and H may be reversed, if desired— that is to say, the portion C may be attached to the thill and H to the axle.

My coupling is well adapted for use on other devices—such as harness, hammocks, and the like—when a rigid and substantial construction is desired.

I am aware that to use tongue-and-grooved portions of a thill-coupling is not new; but my particular construction as to locking means used in connection with the coupling I believe is new.

I claim—

In a thill-coupling, the body portion C having a vertical dovetailed groove C' therein, said portion being attached to the axle of the vehicle, the thill portion H having a tongue I to enter said groove, a spring-actuated horizontal plunger within the body C at right angles to the depth of the groove C' and parallel with the vehicle-axle, said plunger consisting of a stem K seated in a bore in the body portion C between the groove C' and the axle, a finger-piece O at one end, a counterbore N in the portion C for the said finger-piece to enter, a spring Q surrounding the stem within said bore N, a tapered disk L at the opposite end of the stem K, a counterbore M in the said portion for said disk to move in, said bore intercepting the groove C' whereby said disk is permitted to enter said groove C', and a notch P in the tongue I adapted to receive the disk to prevent movement of the parts after assembling the same substantially as set forth.

In testimony whereof I affix my signature in presence of two witnesses.

JAMES L. FRAZIER.

Witnesses:
FRANK T. MILLER,
B. S. BRODE.